United States Patent Office 3,766,102
Patented Oct. 16, 1973

3,766,102
MOLDED, MICROPOROUS, UNSATURATED, POLYESTER RESIN
Gerhard Josef Pietsch and Emil Alfred Vitalis, Stamford, Conn., assignors to American Cyanamid Company, Stamford, Conn.
No Drawing. Continuation-in-part of abandoned application Ser. No. 159,516, July 2, 1971. This application July 3, 1972, Ser. No. 268,383
Int. Cl. C08g 53/08
U.S. Cl. 260—2.5 N                10 Claims

ABSTRACT OF THE DISCLOSURE

There is provided a method for preparing a hard, porous article by effecting emulsion polymerization of an unsaturated polyester resin in the presence of a small, but effective, amount of the alkali metal salt of the sulfosuccinate diester of a monohydric aliphatic alcohol containing from 10 to 18 carbon atoms, thereby forming an unstable water-in-oil emulsion, curing the same and, thereafter, rapidly removing substantially all the water from the cured or hardened product to create voids therein, while preserving completely the article's integrity subsequent to molding.

---

This application is a continuation-in-part of our copending application, Ser. No. 159,516, filed July 2, 1971, now abandoned.

The present invention relates to a microporous, resinous product. More particularly, it relates to a microporous, resinous product made by the polymerization of a mixture of a polyester of an ethylenically $\alpha,\beta$-dicarboxylic acid with a glycol, which polyester contains unesterified or free carboxyl groups, and a liquid, monomeric, unsaturated, polymerizable compound containing an ethylenic linkage, such as styrene. Still more particularly, the invention is concerned with a microporous, resinous product of excellent integrity from which emulsified water has been rapidly removed by incorporating a small, but effective, amout of the alkali metal salt of the sulfosuccinate diester of a monohydric aliphatic alcohol containing from 10 to about 18 carbon atoms, thereby forming an unstable water-in-oil emulsion, curing the same and, thereafter, removing water rapidly from the cured or hardened microporous product.

It is long known that water can be removed from certain cured resinous products. In one process, as exemplified by E. L. Kropa's U.S. Letters Patent No. 2,443,735, issued on June 22, 1948, there is disclosed the addition of compatible emulsifiers to polyester resins prior to emulsion polymerization for purposes of stabilizing the emulsion, effecting compression molding, and removing water therefrom by drying the same. Such emulsifiers include the amyl, hexyl, or octyl sulfosuccinic acid diesters and salts thereof. Moreover, the use of polymeric materials, such as polystyrene as an emulsifier to assist in drying, has also been disclosed in G. Will's U.S. Letters Patent No. 3,256,219, issued on June 14, 1966. Unfortunately, none of these procedures is entirely satisfactory for the reason that not all, but rather substantially less than all, the water is initially eliminated from a cured, molded polyester product when dried. Subsequently, upon elimination of additional quantities of occluded water over a long period of time, say six months or a year, so-eliminated water will cause the molded structure to lose its original definitions. Thus, the dried, molded structure distorts and is said to lack integrity. If substantially all the water can be rapidly removed immediately subsequent to curing so that a molded structure does not lose its residual water and, therefore, its integrity, such a procedure would fulfill a long-felt need in the art.

It is, therefore, a principal object of the invention to provide cured, microporous, polyester, resinous reaction products substantially free from water. It is a further object to provide a cured, microporous, resinous reaction product, substantially free from water, by incorporating prior to emulsion polymerization and cure of a polyester resin, an alkali metal salt of sulfosuccinate diester of a monohydric alcohol of from 10 to 18 carbon atoms. Other objects and advantages will become apparent from a consideration of the ensuing description.

To this end, it has been found, unexpectedly, that the incorporation of small, but effective, amounts of the alkali metal salt of the sulfosuccinate diester of a monohydric alcohol of from 10 to 18 carbon atoms, when incorporated prior to emulsion polymerization of a polyester resin, causes the resultant water-in-oil emulsion to become unstable. As such, substantially all, if not all, the water is rapidly released after gelation or curing occurs. This occurs at temperatures ranging from about 25° C. (room temperature) to about 130° C., or higher, and, correspondingly, at times ranging from about three days to two hours. The resultant resinous product possesses good to excellent integrity and does not distort with time.

According to the invention, any unsaturated polyester resin, prior to cure, is cut with styrene and, thereafter, emulsion polymerized to effect cross-linking or gelation. A small, but effective, amount of a specific emulsifier, namely, the alkali metal salt of the sulfosuccinate diester of a monohydric, aliphatic alcohol containing from 10 to 18 carbon atoms, is added to the emulsion to prepare an unstable water-in-oil emulsion. It is found that, after curing and molding of the resinous reaction product, substantially all the water, namely, from 95% to 100%, can be removed from the molded product by subjecting the molded article, for instance, to heat at a temperature from 120° C. to 130° C. for from two to three hours.

The polyester resins employed in the practice of the present invention are all well known in the art and are prepared by reacting polycarboxylic acids, or their anhydrides, with polyhydric alcohol. They are prepared using a procedure wherein at least one of the reactive components contains $\alpha,\beta$-ethylenic unsaturation. By following this procedure, resinous, essentially linear esterification or condensation products containing a plurality of ethylenically unsaturated linkages distributed along the backbones of their polymer chains are produced.

The use of $\alpha,\beta$-ethylenically unsaturated polycarboxylic acids provides a convenient method of introducing ethylenic unsaturation into the polyester resins. It is preferred to employ $\alpha,\beta$-ethylenically unsaturated dicarboxylic acids, such as maleic, fumaric, citraconic, $\gamma,\gamma$-dimethylcitraconic, mesaconic, itaconic, $\alpha$-methylitaconic, $\gamma$-methylitaconic, teraconic, and the like, as well as mixtures thereof, but minor amounts of $\alpha,\beta$-ethylenically unsaturated polycarboxylic acids containing three or more carboxyl groups, such as aconitic acid and the like, together with the particular $\alpha,\beta$-ethylenically unsaturated dicarboxylic acid or acids chosen, may also be used.

Whenever available, the anhydrides of any of the aforementioned $\alpha,\beta$-ethylenically unsaturated polycarboxylic acids may be substituted for said acids in whole or in part.

Any of the large class of polyhydric alcohols ordinarily used in preparing reactive polyester resins may be employed in the practice of the present invention. While dihydric alcohols, and especially saturated aliphatic diols, are preferred as coreactants in the preparation of the polyester resins, it is not mandatory that all of the polyol used be of this type in that small amounts, e.g., usually up to about 10% of the total equivalents of hydroxyl groups present in the esterification mixture of polyols having more than two hydroxyl groups, may also be employed. Among the dihydric alcohols which may be employed are saturated aliphtaic diols, such as ethylene glycol, propylene glycol, butylene glycol, diethylene glycol, dipropylene glycol, triethylene glycol, tetraethylene glycol, butanediol-1,2, butanediol-1,3, butanediol-1,4, pentanediol-1,2, pentanediol-1,3, pentanediol-1,4, pentanediol-1,5, hexanediol-1,2, hexanediol-1,3, hexanediol-1,4, hexanediol-1,5, hexanediol-1,6, neopentyl glycol, and the like, as well as mixtures thereof. Among the polyols having more than two hydroxyl groups which may be employed in minor amounts, together with the above-mentioned diols, are saturated aliphatic polyols, such as diglycerol, trimethylol ethane, trimethylol propane, pentaerythritol, dipentaerythritol, arabitol, xylitol, dulcitol, adonitol, sorbitol, mannitol, and the like, as well as mixtures thereof.

Among the halogenated polyols that may be employed are 2,2-chloromethylpropanediol-1,3, adducts of hexachlorocyclopentadiene with unsaturated polyols, such as butenediols, pentenediols, and the like, and adducts of hexachlorocyclopentadiene with polyols having three or more hydroxyl groups, one of which is etherified with an unsaturated alcohol reactive with hexachlorocyclopentadiene. Among the latter are compounds such as 3-[1,4,5,6,7,7-hexachlorobicyclo-(2.2.1)-5-hepten - 2 - yloxy]-1,2-propanediol, which is the adduct of hexachlorocyclopentadiene with glycerol ether, 3-[1,4,5,6,7,7-hexachlorobicyclo-(2.2.1)-5-hepten-2-yl] - methoxy - 1,2 - propane diol, which is the adduct of hexachlorocyclopentadiene with allyl glycerol, adducts of hexachlorocyclopentadiene with vinyl and allyl ethers of pentaerythritol, and the like. Mixtures of these halogenated polyols may also be employed, if desired.

The esterification mixtures, from which the polyester resins employed in the practice of the present invention are prepared, are generally formulated so as to contain at least a stoichiometric balance between carboxyl and hydroxyl groups. Thus, where a diol and a dicarboxylic acid are employed, they are usually reacted on at least a mol-to-mol basis. In common commercial practice, a small excess of polyol, usually in the range of from about 5% to about 15% excess, is employed. This is done primarily for economic reasons, i.e., to insure a rapid rate of esterification.

Unsaturated polyester resins used in the practice of the present invention are formed in the manner customarily observed in the art. Thus, the particular polycarboxylic acid or acids and polyol or polyols employed are reacted at elevated temperatures and atmospheric pressure. Since resinifying reactants of this type are prone to develop undesirable color when in contact with air at elevated temperatures, it is generally considered good practice to conduct the esterification reaction in an inert atmosphere, such as can be obtained by bubbling an inert gas, e.g., carbon dioxide, nitrogen, and the like, through the esterification mixture. The reaction temperature is not critical; thus, the reaction will preferably be carried out at a temperature which usually will be just below the boiling point of the most volatile component of the reaction mixture, generally the polyol.

The esterification mixture should be sufficiently reacted so as to ultimately produce a polyester resin having an acid number not appreciably more than about 75. It is prefered to employ polyester resins having acid numbers ranging from about 10 to about 30, or below.

Resultant unsaturated polyester resin is next diluted with from 20% to 60% styrene. To the so-diluted polyester resin is then added, with agitation, an alkali metal salt of sulfo-succinate diester of a monohydric aliphatic alcohol containing from 10 to 18 carbon atoms, followed by the addition of water containing a suitable polymerization catalyst to form a water-in-oil emulsion. The so-treated emulsified mixture is poured into a suitable mold gelling takes place followed by curing to obtain the desired cross-linked article. If the product is too thick to pour, it is highly advantageous to incorporate small amounts of a viscosity reducer, namely, a mixed octadecyl-guanidine-amine polyoxyethanol.

Generally, the amount of water added to form the desired emulsion ranges from about 40% to 60%, by weight, based on the styrene polyester resin mixture employed. For best operation, equal parts, by weight, of water composition and the polyester composition are employed. The remainder of the composition consists of the said styrene polyester resin mixture.

It is good practice to incorporate of from about 0.1% to about 5% of the alkali metal salt of sulfosuccinate diester of a monohydric aliphatic alcohol of from 10 to 18 carbon atoms, based on the weight of the overall resin mixture. Usually, of from 0.3% to 0.6% is a good operating range. In general, the alkali metal salt of the diester contemplates the potassium salt of sulfosuccinate diester of decyl alcohol or undecyl alcohol or lauryl alcohol, the sodium salt of sulfosuccinate diester of tridecyl alcohol, the potassium salt of sulfosuccinate diester of myristyl alcohol, the lithium salt of sulfosuccinate diester of pentadecyl or stearyl alcohol, the sodium salt of sulfosuccinate diester of octadecyl alcohol, and mixtures of the same.

As previously stated, the viscosity of the polyester resin prior to cross-linking can be reduced by incorporating therein of from about 0.1% to about 2% of a mixed octadecyl-guanidine-amine polyoxyethanol which is employed usually as a 70% aqueous solution.

Preparation of a styrenated polyester resin containing at least a cobalt and a compatible tertiary amine in water catalyzed by a suitable peroxide, such as hydrogen peroxide, is well known. However, absent the incorporation of small amounts of a sepecific class of emulsifiers into the resin mixture and, optionally, a specific viscosity reducer, substantially rapid total water removal after gelation cannot be achieved.

The following examples are presented for purposes of further clarifying the invention. These examples are by way of illustration and are not to be construed as being limitative. Unless otherwise stated, the parts are by weight.

EXAMPLE 1

To 55 parts of styrene and 45 parts of a polyester resin prepared by esterifying at a temperature of about 225° C., 0.22 mol of dipropylene glycol, 2.95 mols of diethylene glycol, 3.10 mols of propylene glycol, 0.29 mol of adipic acid, 3.99 mols of iso-phthalic acid and 1.80 mols of maleic anthydride for a time sufficient to obtain an acid number between 10 and 15, are added one part by volume of cobalt, as a 12% solution of cobalt octoate, and 0.4 part by volume of dimethyl aniline. To the latter styrene-resin mixture is admixed 0.4 part of the sodium salt of sulfosuccinate diester of tridecyl alcohol and 0.4 part of a mixed octadecyl-guanidine-amine polyoxyethanol. Resultant overall mixture is next emulsified with 100 parts of water containing one part of a 30% solution of hydrogen peroxide polymerization initiator. This emulsion is poured into a suitable mold. Gelation or cross-linking occurs within fifteen minutes after introduction into the mold and the molded article is removed. The latter article is then heated to a temperature between about 120° C. and about 130° C. for a period of three hours. It is found that 99% of the total water originally present in the resinous mixture is removed.

EXAMPLE 2

Repeating the above Example 1 in every detail except the emulsifying mixture consisting of the sodium salt of the sulfosuccinic diester of tridecyl alcohol and the mixed octadecylguanidine-amine polyoxyethanol is omitted, there is removed a total of approximately 21% of the water present, leaving as a residue some 79% to 80% of water in the molded article.

EXAMPLE 3

The procedure of Example 1 is repeated in every detail except that the sodium salt of sulfosuccinate diester of lauryl alcohol is substituted for the sodium salt of sulfosuccinate diester of tridecyl alcohol. Similar results with respect to water removal are observed.

EXAMPLE 4

Repeating in every detail the procedure of Example 1, except that in the emulsifying mixture the mixed octadecyl-guanidine-amine polyoxyethanol is eliminated, there then results the removal of 95% to 99% water from the dehydrated molded article.

EXAMPLE 5

The procedure of Example 1 is followed in every detail except that the polyester resin is prepared by reacting at a temperature of approximately 225° C. for a time sufficient to obtain an acid number between 10 and 14, 2.14 mols of ethylene glycol, 4.3 mols of propylene glycol, 2.90 mols of iso-phthalic acid and 3.10 mols of maleic anhydride. There is removed approximately 99% of the water from the molded article.

EXAMPLE 6

Repeating Example 1 in every detail except that the polyester resin is prepared by reacting 6.80 mols of diethylene glycol, 3.0 mols of iso-phthalic acid, 0.60 mol of dimeric higher fatty acids (Emery Industries No. 4,050) and 2.40 mols of maleic anhydride to obtain an acid number of from 10 to 15. Since the resultant resin is exceedingly viscous, the sodium salt of sulfosuccinate diester of tridecyl alcohol content is increased to 1.4 parts and the mixed octadecyl-guanidine-amine polyoxyethanol is increased to 0.8 part. Approximately 95% of the water is removed from the molded article when dehydrated.

EXAMPLE 7

In lieu of the emulsifying agents employed in Example 1 above, there is substituted therefor 0.3% of each of (a) a phenoxy resin PAHJ obtained from Union Carbide, (b) Bakelite RMD 4,500 obtained from Union Carbide, which resin is a copolymer of styrene and acrylonitrile, (c) polystyrene obtained from the Shell Chemical Company and (d) the sodium salt of sulfonsuccinate diester of octyl or nonyl alcohol. When dehydrated, losses of not more than 20% of the total water initially present were noted.

EXAMPLE 8

The procedure of Example 1 above is repeated in every detail except that the potassium salt of sulfosuccinate diesters of decyl, myristyl or octadecyl alcohol is separately substituted for the corresponding sodium salt of the sulfosuccinate diester of tridecyl alcohol. Removal of more than 94% of the water from the cured resin at 120° C. to 130° C. within two to three hours is readily attained.

EXAMPLE 9

Repeating the procedure of Example 1 in every detail except the molded article after removal from the mold is allowed to remain at room temperature for about 72 hours. It is found that about 99% of the total water in the resinous mixture is removed.

EXAMPLE 10

The procedure of Example 7 is repeated in every detail except that the molded articles, upon removal from their molds, are allowed to remain at room temperature for about 72 hours. It is found that less than about 5% of the total water in the resinous mixture is removed.

We claim:

1. A process for obtaining a molded, microporous, unsaturated, polyester resin from which water has been removed, comprising adding to 60 to 40 parts of a mixture of 40% to 80% of an unsaturated polyester resin, correspondingly from 60% to 20% of styrene, a cobalt promoter and a tertiary amine, from 40 to 60 parts of water containing a polymerization catalyst and a small, but effective, amount of an emulsifier, said emulsifier being the alkali metal salt of a sulfosuccinic acid diester of a monohydric, aliphatic alcohol containing from 10 to 18 carbon atoms, agitating said mixture to obtain a water-in-oil emulsion, causing cross-linking of the resin in said mixture to occur due to the presence of sytrene, and thereafter, removing by dehydration, substantially all of the water from the cross-linked resin.

2. The process according to claim 1 in which the emulsifier is the sodium salt of sulfosuccinate diester of tridecyl alcohol.

3. The process according to claim 1 in which from between about 0.1% and about 5% of the alkali metal salt is added.

4. The process according to claim 1 in which dehydration takes place at a temperature between about 120° C. and 130° C. for about three hours.

5. The process according to claim 1 in which there is added in addition to said emulsifier small, but effective, amounts of a mixed octadecyl-guanidine-amine polyoxyethanol.

6. The process according to claim 5 in which the mixed octadecyl-guanidine-amine polyoxyethanol is present in an amount ranging from about 0.1% to about 2%, based on the weight of the resin.

7. The process according to claim 1 in which the polyester resin is prepared from a mixture of ethylene glycol, isophthalic acid, and maleic anhydride.

8. The process according to claim 1 in which the polyester resin is prepared by reacting a mixture of dipropylene glycol, diethylene glycol, propylene glycol, adipic acid, isophthalic acid and maleic anhydride.

9. The process according to claim 1 in which the emulsifier is the potassium salt of sulfosuccinate diester of decyl alcohol.

10. A molded, microporous substantially completely dehydrated, unsaturated polyester resin composition made by the process of claim 1 comprising the cross-linked product of a mixture of from 40% to 80% of an unsaturated polyester resin, correspondingly from 60% to 20% of styrene and a small but effective amount of an alkali metal salt of a sulfosuccinic acid diester of a monohydric aliphatic alcohol containing from 10 to 18 carbon atoms.

References Cited

UNITED STATES PATENTS

| Re. 27,444 | 6/1972 | Will | 260—2.5 B |
| --- | --- | --- | --- |
| 3,256,219 | 6/1966 | Will | 260—2.5 B |
| 3,244,772 | 4/1966 | Von Bonin | 260—2.5 B |
| 3,255,127 | 6/1966 | Von Bonin | 260—2.5 B |
| 3,442,842 | 5/1969 | Von Bonin | 260—2.5 B |

JOHN C. BLEUTGE, Primary Examiner

M. FOELAK, Assistant Examiner

U.S. Cl. X.R.

260—29.6 RB, 29.62, 29.6 SQ, 29.6 MQ, 861, 863, 865